US008928556B2

(12) United States Patent
Yasue et al.

(10) Patent No.: US 8,928,556 B2
(45) Date of Patent: Jan. 6, 2015

(54) HEAD MOUNTED DISPLAY

(75) Inventors: Norimi Yasue, Nagoya (JP); Hideaki Yamada, Obu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 785 days.

(21) Appl. No.: 13/187,981

(22) Filed: Jul. 21, 2011

(65) Prior Publication Data

US 2011/0279355 A1 Nov. 17, 2011

Related U.S. Application Data

(63) Continuation-in-part of application No. PCT/JP2010/050836, filed on Jan. 22, 2010.

(30) Foreign Application Priority Data

Jan. 27, 2009 (JP) ................................. 2009-015661

(51) Int. Cl.
G09G 5/00 (2006.01)
G02B 27/01 (2006.01)
G09G 5/397 (2006.01)
H04N 21/434 (2011.01)

(52) U.S. Cl.
CPC ...... *G02B 27/017* (2013.01); *G02B 2027/0112* (2013.01); *G02B 2027/0118* (2013.01); *G02B 2027/0138* (2013.01); *G02B 2027/014* (2013.01); *G09G 5/397* (2013.01); *G09G 2340/10* (2013.01); *H04N 21/434* (2013.01)
USPC .......................................................... 345/8

(58) Field of Classification Search
CPC .................... G02B 27/017; G02B 2027/0112; G02B 2027/0118; G02B 2027/0138; G02B 2027/014; G09G 2340/10; G09G 5/397; H04N 21/434
USPC .............................................................. 345/7–9
See application file for complete search history.

(56) References Cited

U.S. PATENT DOCUMENTS 6,037,914 A * 3/2000 Robinson ........................... 345/7
6,101,431 A * 8/2000 Niwa et al. ....................... 701/14
(Continued)

FOREIGN PATENT DOCUMENTS

JP A-2006-36166 2/2006
JP A-2006-119297 5/2006
(Continued)

OTHER PUBLICATIONS

Starner, Thad et al., "Augmented Reality Through Werable Computing", 1997, M.I.T. Media Laboratory Perceptual Computing Section Technical Report No. 397, 9 pages.*
International Search Report mailed Mar. 2, 2010 issued in International Patent Application No. PCT/JP2010/050836 (with translation).

*Primary Examiner* — Dwayne Bost
*Assistant Examiner* — Ivelisse Martinez Quiles
(74) *Attorney, Agent, or Firm* — Oliff PLC

(57) ABSTRACT

An imaging unit images a predetermined range including at least a range where an image is displayed out of a field-of-view range of a user. An image forming unit forms a background canceling image which cancels a background image which is visually recognized by a user via an external light based on an imaged image imaged by the imaging unit. The image forming unit combines the background canceling image with the original image corresponding to original image information by aligning them in terms of display position and size. An image formed by combining the background canceling image with the original image is displayed on the display unit by a display control unit.

7 Claims, 17 Drawing Sheets

(56) References Cited

U.S. PATENT DOCUMENTS

| | | | |
|---|---|---|---|
| 6,417,969 B1* | 7/2002 | DeLuca et al. | 359/630 |
| 6,559,813 B1* | 5/2003 | DeLuca et al. | 345/8 |
| 7,487,468 B2* | 2/2009 | Tanaka et al. | 715/863 |
| 8,314,812 B1* | 11/2012 | Eckel | 345/611 |
| 2002/0044152 A1* | 4/2002 | Abbott et al. | 345/629 |
| 2002/0057280 A1* | 5/2002 | Anabuki et al. | 345/633 |
| 2008/0304737 A1* | 12/2008 | Kajita et al. | 382/165 |
| 2009/0184889 A1* | 7/2009 | Kier et al. | 345/8 |
| 2010/0182340 A1* | 7/2010 | Bachelder et al. | 345/633 |

FOREIGN PATENT DOCUMENTS

| | | |
|---|---|---|
| JP | A-2006-126691 | 5/2006 |
| JP | A-2006-165773 | 6/2006 |
| JP | A-2006-267887 | 10/2006 |
| JP | A-2008-116704 | 5/2008 |

* cited by examiner

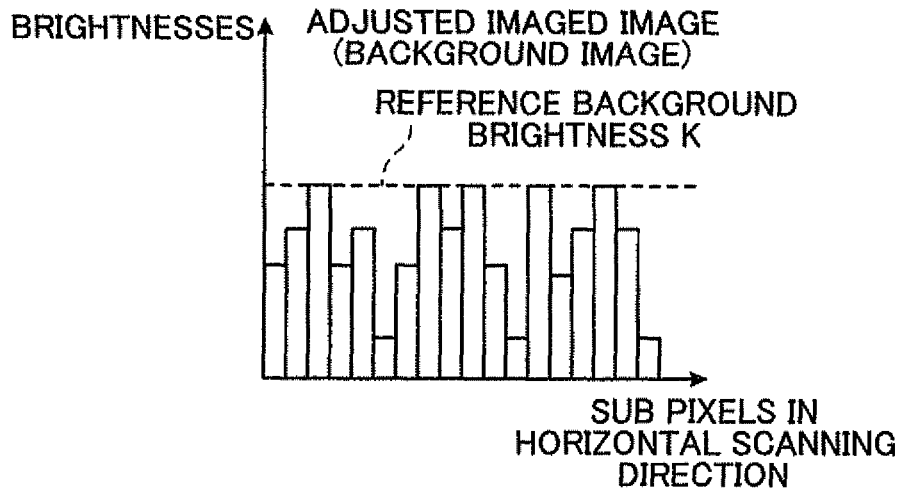

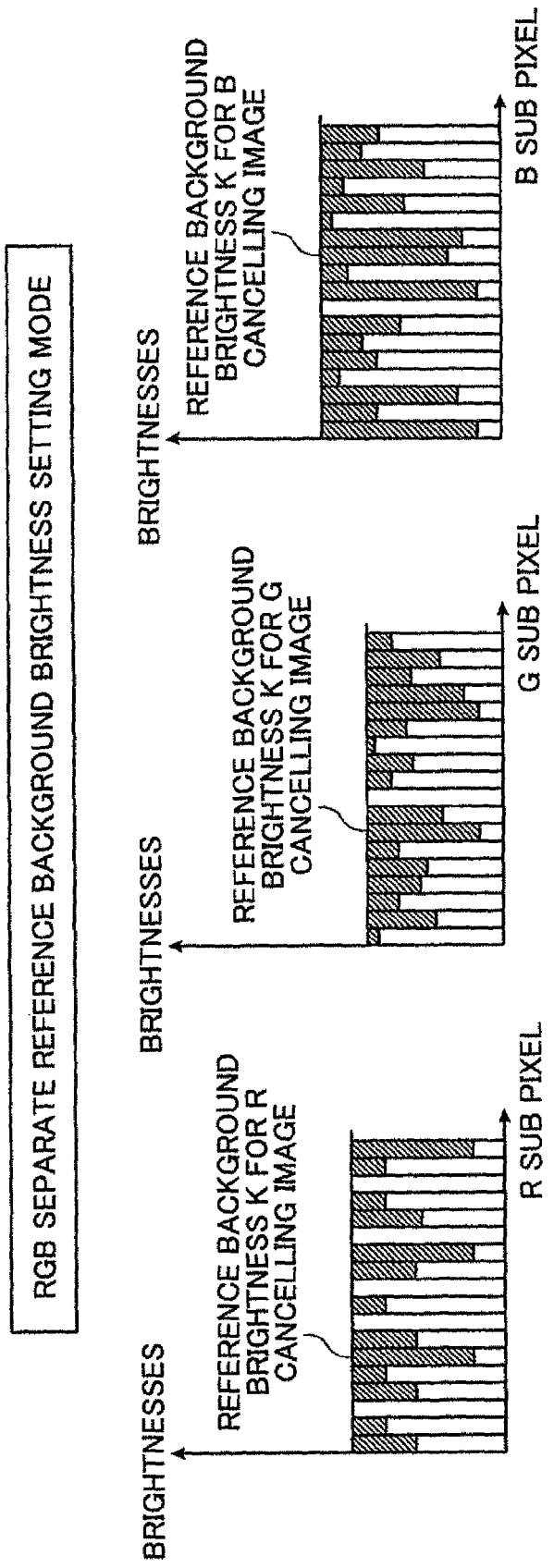

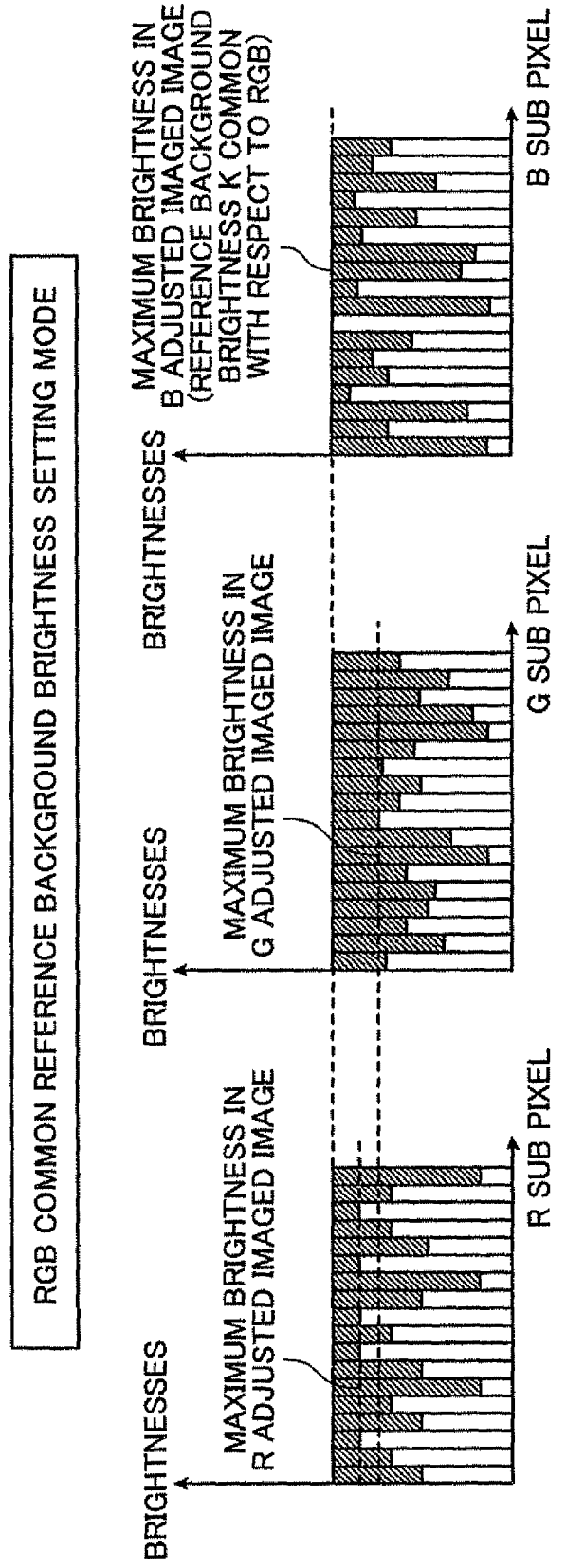

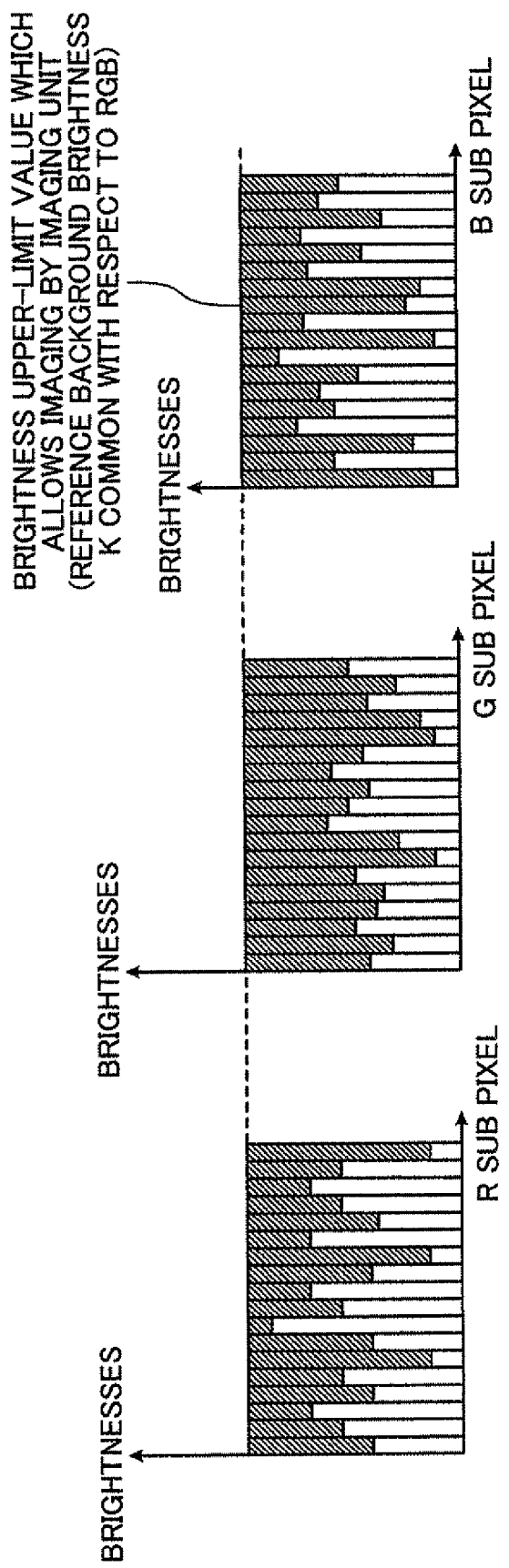

HEAD MOUNTED DISPLAY

CROSS-REFERENCE TO RELATED APPLICATIONS

The present application is a Continuation-in-Part of the International Application PCT/JP2010/050836 filed on Jan. 22, 2010, which claims the benefits of Japanese Patent Application No. 2009-015661 filed on Jan. 27, 2009.

BACKGROUND

1. Field

The present invention relates to a head mounted display (hereinafter referred to as HMD).

2. Description of the Related Art

Conventionally, there has been known a see-through-type HMD. This see-through-type HMD includes a display unit which projects an image light having intensity corresponding to image information thus allowing a user to visually recognize a display image which is a virtual image corresponding to the image light in front of an eye of the user while allowing an external light to pass therethrough (see JP-A-2006-165773, for example).

Accordingly, the user who wears the see-through-type HMD on his head visually recognizes both a background image which is scenery of an external world in the viewing direction and a display image which is a virtual image.

SUMMARY

However, in the above-mentioned conventional see-through-type HMD, when a content of a display image is a fine image such as a character or a complicated pattern, an image having brightness near brightness of a background image or the like, the display image becomes indistinguishable from the background image so that the display image becomes hardly recognizable.

The present invention has been made under such circumstances, and it is an object of the present invention to provide an HMD which allows a user to visually recognize any display image easily by preventing the display image from becoming indistinguishable from a background image although the HMD is a see-through-type HMD.

To achieve the above-mentioned object, according to one aspect of the present invention, there is provided a see-through-type head mounted display which includes: a display unit; an imaging unit; an image forming unit; an image processing unit; and a display control unit. The display unit projects an image light having intensity corresponding to image information on an eye of a user thus allowing the user to visually recognize an image corresponding to the image light, while allowing an external light to pass therethrough. The imaging unit images a predetermined range including at least a range where the image is displayed out of a field-of-view range of the user. The image forming unit forms a background cancelling image based on an imaged image imaged by the imaging unit. The background cancelling image is an image which, when the image is superposed on a background image derived from the external light and visually recognized by the user, becomes an image having reference background brightness which is fixed brightness during a predetermined frame period for respective three primary colors thus cancelling the background image. The image processing unit combines the background cancelling image with an image corresponding to original image information by aligning the background cancelling image and the original image with each other in terms of display position and size. The display control unit performs a control by which an image with which the background cancelling image is combined is displayed by the display unit.

Since the HMD has the above-mentioned constitution, an image corresponding to original image information is displayed in a region which becomes monochromatic when the image is superposed on the background image. Accordingly, in this HMD, even when an original image is a fine image such as a character or a complicated pattern, an image having brightness near brightness of a background image or the like, there is no possibility that an original image becomes indistinguishable from a background image thus allowing a user to visually recognize the original image easily. Hereinafter, the region which becomes monochromatic when the image is superposed on the background image is referred to as "mask region" and the image corresponding to the original image information is referred to as "original image".

BRIEF DESCRIPTION OF THE DRAWINGS

FIG. 4A is an explanatory view for explaining image processing of the HMD according to the embodiment;

FIG. 4B is an explanatory view for explaining image processing of the HMD according to the embodiment;

FIG. 4C is an explanatory view for explaining image processing of the HMD according to the embodiment;

FIG. 5A is an explanatory view for explaining image processing of the HMD according to the embodiment;

FIG. 5B is an explanatory view for explaining image processing of the HMD according to the embodiment;

FIG. 5C is an explanatory view for explaining image processing of the HMD according to the embodiment;

DETAILED DESCRIPTION

An HMD according to this embodiment, in displaying an image to a user, forms a region where a part of or the whole external scenery is cancelled in the direction of line of sight of a user, and an image is displayed in this scenery-cancelled region. Accordingly, a user can visually recognize an image displayed by the HMD easily. Particularly, the visibility of an image having relatively a large number of edges such as a character and a pattern can be enhanced. In the explanation made hereinafter, the external scenery in the direction of line of sight of the user is referred to as "background image" and a region where a part of or the whole background image is cancelled is referred to as a mask region.

The HMD according to this embodiment is briefly explained in conjunction with drawings. In the explanation made hereinafter, "image" means, unless otherwise specified, "image" which a user visually recognizes, and may also mean image data or image signal. This "image" may be interpreted in both meanings provided such interpretation is allowed technically.

Figure 1:
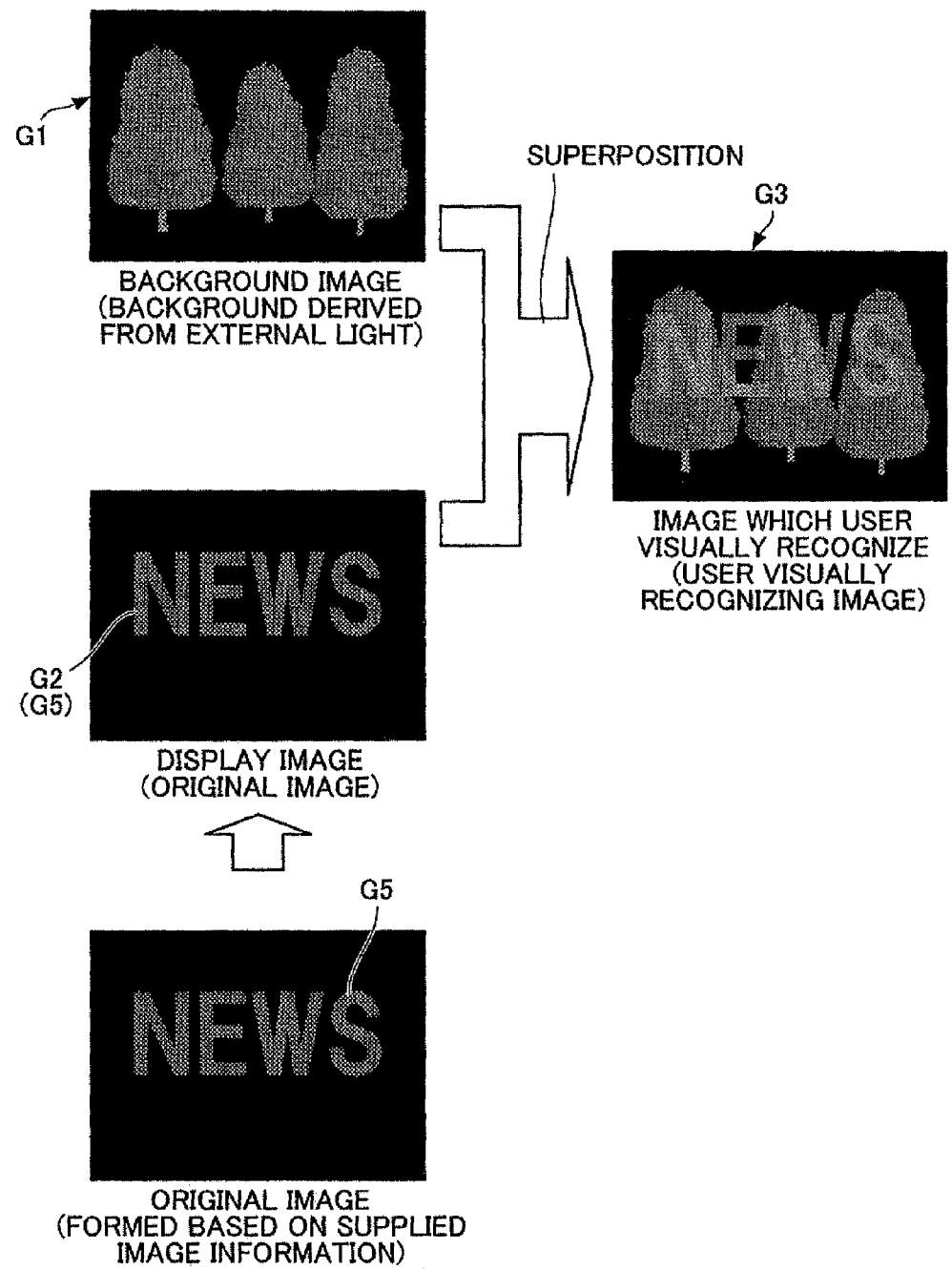
FIG. 1 is an explanatory view for explaining a technical feature of an HMD according to an embodiment.
Figure 2:
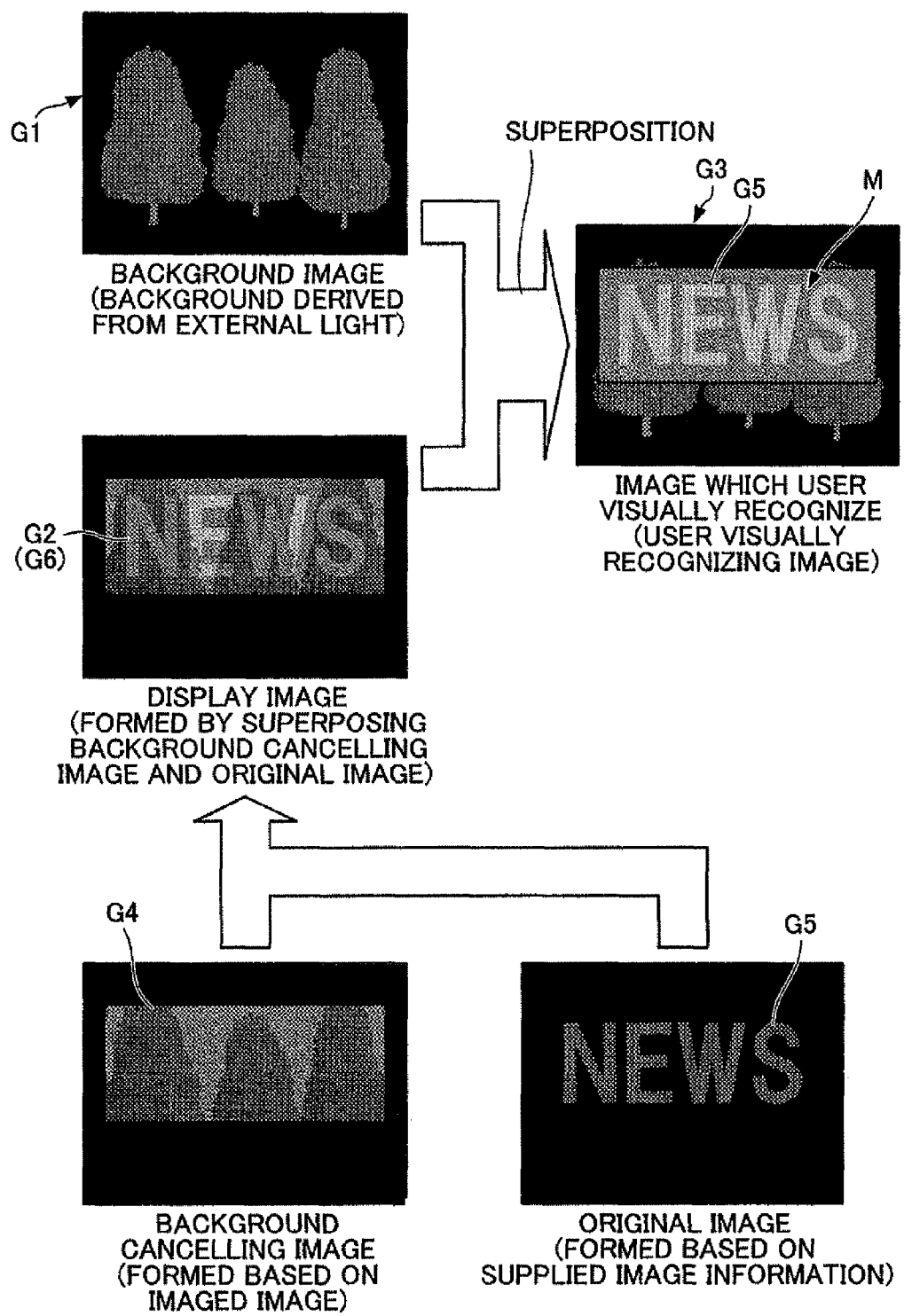
FIG. 2 is an explanatory view for explaining a technical feature of the HMD according to the embodiment.

Firstly, technical features of the HMD according to this embodiment are explained in conjunction with FIG. 1 and FIG. 2. Here, to facilitate the explanation of the HMD, the explanation is made by taking a state where character information is offered to a user as an example. The HMD according to this embodiment has an advantage of allowing a user to easily visually recognize also a general still image and a moving image such as a photograph, a slide and a television image easily. As mentioned previously, the see-through-type HMD is, as shown in FIG. 1, characterized in that both a background image G1 formed of an external light and visually recognized by a user and a display image G2 can be visually recognized in a superposing manner.

Here, the display image G2 shown in FIG. 1 is constituted of only an image G5 which the HMD intends to make a user visually recognize using an image light radiated corresponding to image information (hereinafter referred to as an original image G5). That is, the display image G2 directly uses the original image G5.

The original image G5 is formed based on original image information. The original image information contains data for displaying information to be offered to a user as an image. In the example shown in FIG. 1, character information "NEWS" is given as the information to be offered to the user. The original image information is information supplied from the outside of the HMD or information stored in the inside of the HMD. The original image information may be, for example, an external input image signal, a text file formed of characters, a still image file such as jpeg or a moving image file such as an mpeg.

In a conventional see-through-type HMD, a user visually recognizes the original image G5 based on the original image information as the display image G2. However, in the conventional see-through-type HMD, depending on a state of a background image, as in the case of an image G3 after superposing shown in FIG. 1 (hereinafter referred to as a user visually recognizing image G3), the display image G2 is embedded in a background image G1. Accordingly, there may arise a case where a user has difficulty in the visually recognizing of the display image G2.

Accordingly, in the HMD according to this embodiment, as shown in FIG. 2, a background cancelling image G4 which cancels the background image G1 visually recognized in a see-through manner is formed. The HMD displays an image formed by combining the background cancelling image G4 with the original image G5. The image after the combining becomes a display image G2 to be superposed on the background image G1.

As a result, in a user visually recognizing image G3 after superposition, the original image G5 is clearly displayed within a mask region M where the background image G1 is canceled by the background cancelling image G4.

Here, the mask region M is in an achromatic or monochromatic state with averaged brightness. The original image G5 is displayed in a superposed manner on an achromatic or monochromatic image in the mask region M. Accordingly, although the HMD is a see-through type HMD, the HMD allows a user to visually recognize an image easily by preventing the original image G5 from becoming indistinguishable from the background image G1.

The background cancelling image G4 for forming the mask region M is formed based on an image imaged by an imaging unit provided to the HMD (hereinafter referred to as imaged image).

Next, processing of data from the formation of the background cancelling image G4 to the formation of the user visually recognizing image G3 is explained in conjunction with FIG. 3 and FIG. 4. In the HMD according to this embodiment, an image light is formed by superposing lights of three primary colors consisting of red (R), green (G) and blue (B) for each pixel (hereinafter referred to as sub pixel) and a color image is displayed. Here, processing for red, processing for green and processing for blue are substantially equal and hence, for facilitating the understanding of the invention, the explanation is made hereinafter by taking the processing for red as an example in this embodiment.

In FIG. 3A, FIG. 3B and FIG. 4A to FIG. 4F, out of the pixels in the horizontal scanning direction at arbitrary positions of each image, the brightnesses of the red sub pixels are shown.

Figure 3A:
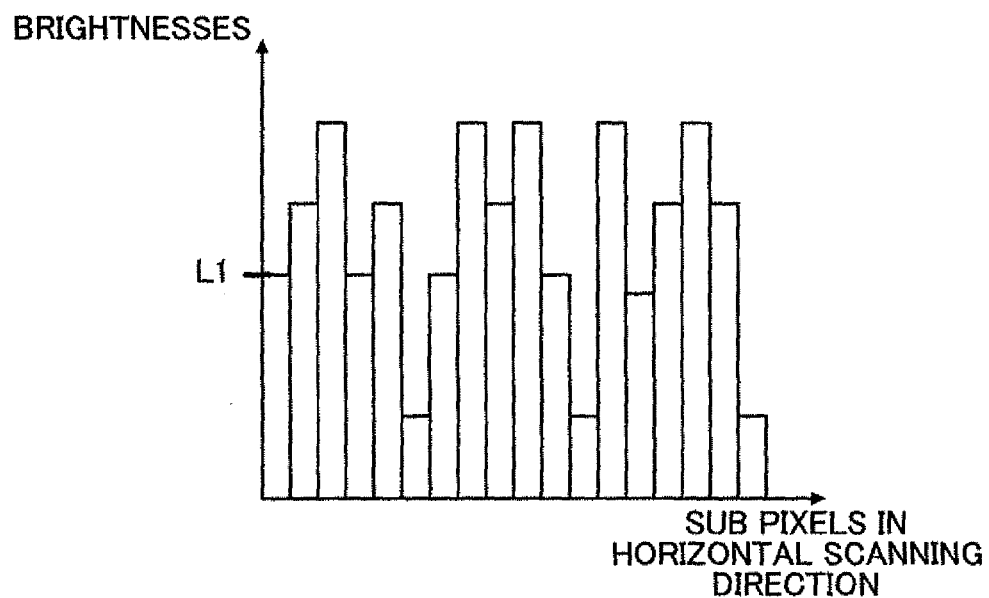
FIG. 3A is an explanatory view for explaining image processing of the HMD according to the embodiment.
Figure 3B:
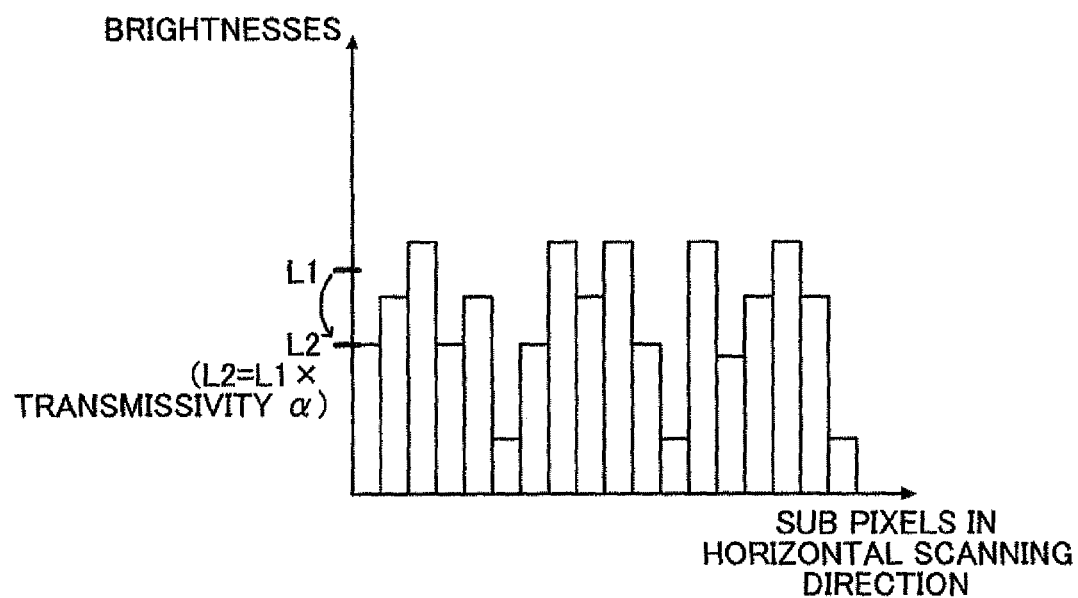
FIG. 3B is an explanatory view for explaining image processing of the HMD according to the embodiment.

Firstly, as shown in FIG. 3A, the HMD images a background image which a user visually recognizes using an imaging unit arranged in the inside of the HMD, and forms an imaged image for every 1 frame. Then, the HMD forms an adjusted imaged image by performing processing which adjusts the brightness of the imaged image to a brightness level of the background image visually recognized by the user in a see-through manner. To be more specific, the HMD forms the adjusted imaged image by performing the brightness adjustment in which the brightnesses of the respective sub pixels of RGB in the imaged image (the respective sub pixels of R in FIG. 3B) is multiplied by transmittance $\alpha$. That is, the HMD forms the adjusted imaged image where an image which a user visually recognizes when the image is projected on his eye becomes the same image as a background image which the user visually recognizes in a see-through manner. For example, to focus on the sub pixel arranged on a leftmost side in FIG. 3A, the brightness of the sub pixel is adjusted from the brightness L1 in the imaged image to the brightness L2 due to conversion by multiplication of transmittance $\alpha$. This transmittance $\alpha$ is optical transmissivity of a see-through part (for example, half mirror). Here, the HMD performs the adjustment to obtain an image which conforms to the display characteristic of the HMD by applying a correction such as a gamma correction to the imaged image.

Next, the brightness equal to or higher than the maximum brightness of the red sub pixels in the adjusted imaged image is set as a reference value. This reference value becomes the brightness of the above-mentioned mask region M. Hereinafter, this reference value is referred to as a reference background brightness K. In FIG. 4A, the reference background brightness K has the same value as the maximum brightness out of brightnesses of the sub pixels in the adjusted imaged image.

Next, the HMD obtains differences between the brightnesses of the respective sub pixels and the reference background brightness K respectively as shown in FIG. 4B. Further, the HMD assumes an image constituted of only these differences as a background cancelling image G4 as shown in FIG. 4C.

Figure 4D:
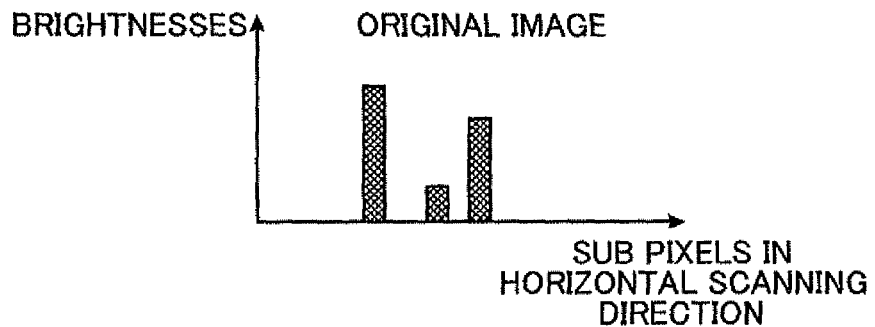
FIG. 4D is an explanatory view for explaining image processing of the HMD according to the embodiment.
Figure 4E:
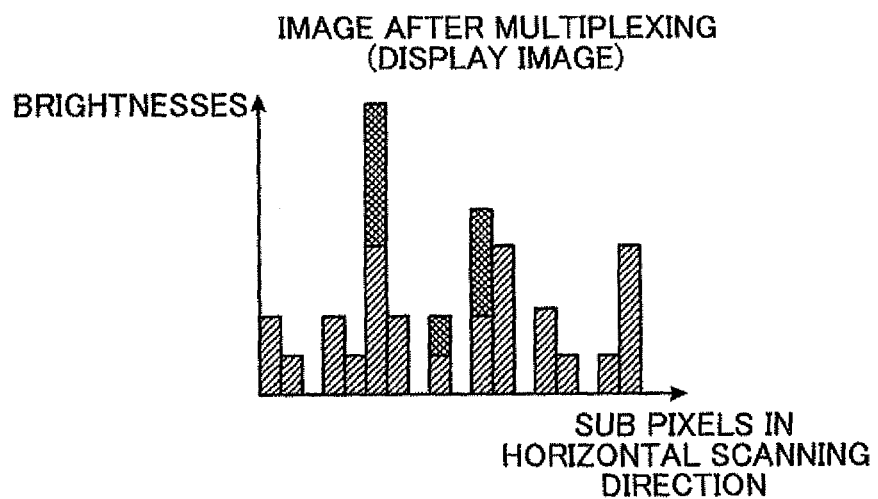
FIG. 4E is an explanatory view for explaining image processing of the HMD according to the embodiment.

Next, the HMD combines an original image G5 shown in FIG. 4D with the background cancelling image G4 (or adds the brightness of the original image G5 to the brightness of the background cancelling image G4) so that a combined image G6 shown in FIG. 4E is obtained. Then, when the HMD assumes the combined image G6 as the display image G2 and displays the combined image G6 to a user, the combined image G6 is superposed on the background image G1 (see FIG. 4A) thus forming a user visually recognizing image G3 shown in FIG. 4F. The user visually recognizes the user visually recognizing image G3.

Figure 4F:
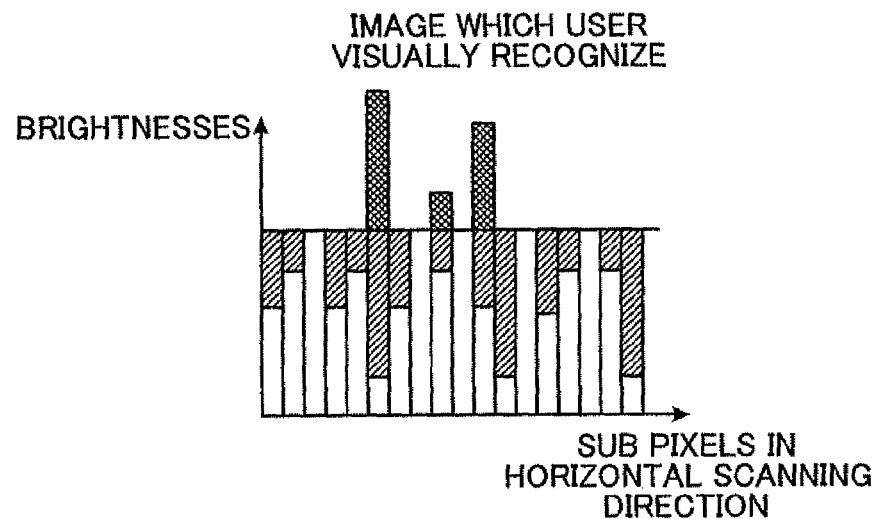
FIG. 4F is an explanatory view for explaining image processing of the HMD according to the embodiment.

The user visually recognizing image G3 is, as can be understood from FIG. 4F, in a state where the brightness of the original image G5 is superposed in the mask region M. The mask region M is constituted such that the brightness of the background image G1 is leveled by the value of the reference background brightness K so that brightness becomes constant.

Accordingly, the user visually recognizes that the original image G5 is displayed on the mask region M having the constant brightness. Accordingly, even when the original image G5 is a fine image constituted of a character, a complicated pattern or the like, the user can visually recognize the original image G5 by preventing the original image G5 from becoming indistinguishable from the background image.

In the above-mentioned HMD, as shown in FIG. 5A, an RGB separate reference background brightness setting mode is adopted as a reference background brightness setting mode. That is, the red reference background brightness K is a value of maximum brightness out of the brightnesses of the red sub pixels in the imaged image. The green reference background brightness K is a value of maximum brightness out of the brightnesses of the green sub pixels in the imaged image. The blue reference background brightness K is a value of maximum brightness out of the brightnesses of the blue sub pixels in the imaged image. The HMD may adopt a reference background brightness setting mode different from the RGB separate reference background brightness setting mode.

For example, as shown in FIG. 5B, the HMD may adopt an RGB common reference background brightness setting mode. In this RGB common reference background brightness setting mode, a value of the maximum brightness out of brightnesses of all sub pixels of three primary colors is set to a reference background brightness K common with respect to red, green and blue. Further, as shown in FIG. 5C, the HMD may adopt a CCD upper-limit reference background brightness setting mode. In this CCD upper-limit reference background brightness setting mode, a brightness upper-limit value which allows imaging by an imaging unit is used as the reference background brightness K. Particularly, in the CCD upper-limit reference background brightness setting mode, the HMD forms a background cancelling image within a brightness range corresponding to a range from the minimum brightness to the maximum brightness with which an imaging by an imaging unit is allowed.

Hereinafter, the preferred embodiment of the present invention is explained specifically in conjunction with drawings.

[Constitution of HMD]

Figure 6:
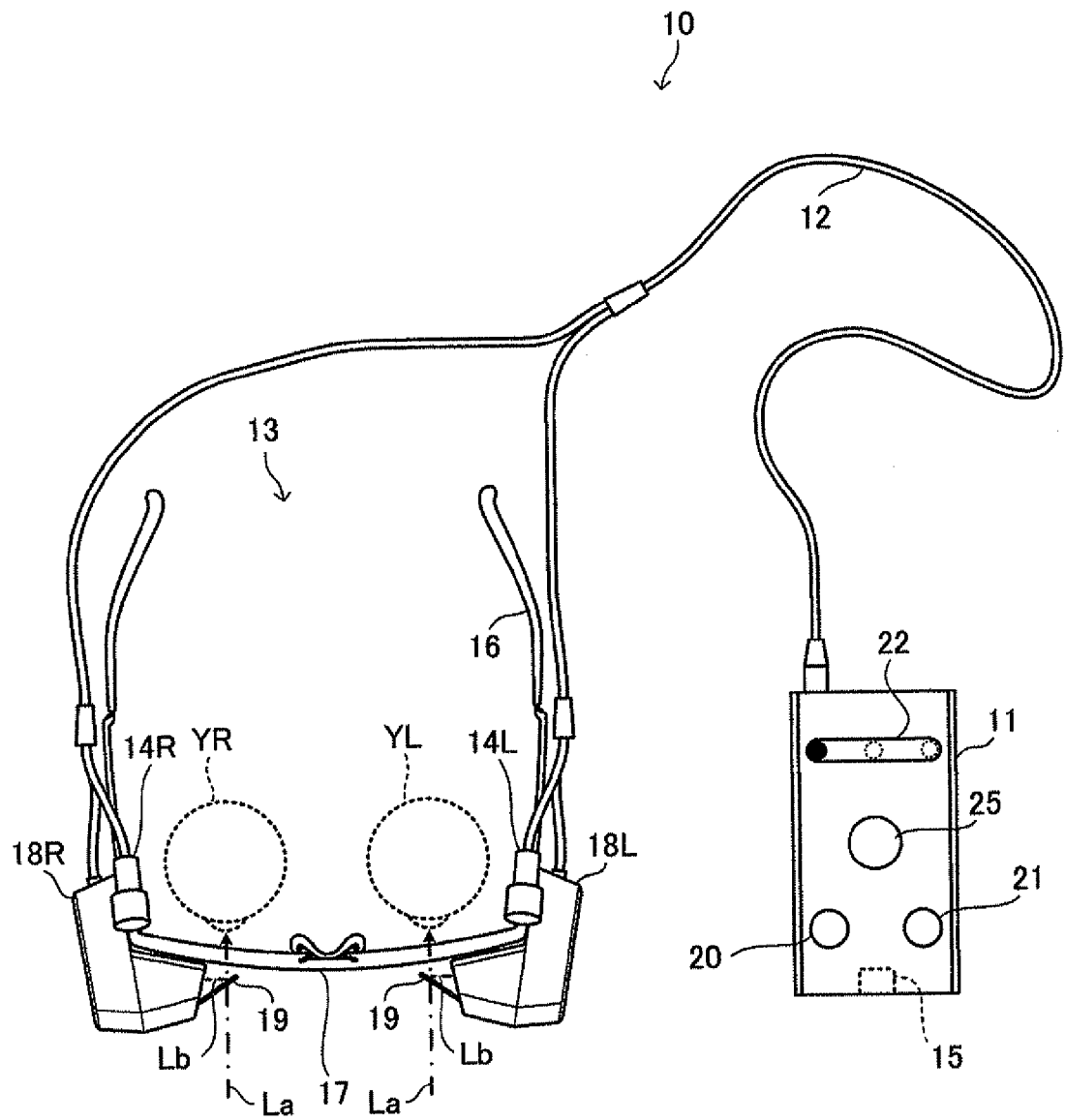
FIG. 6 is an explanatory view showing an appearance of the HMD according to the embodiment.
Figure 7:
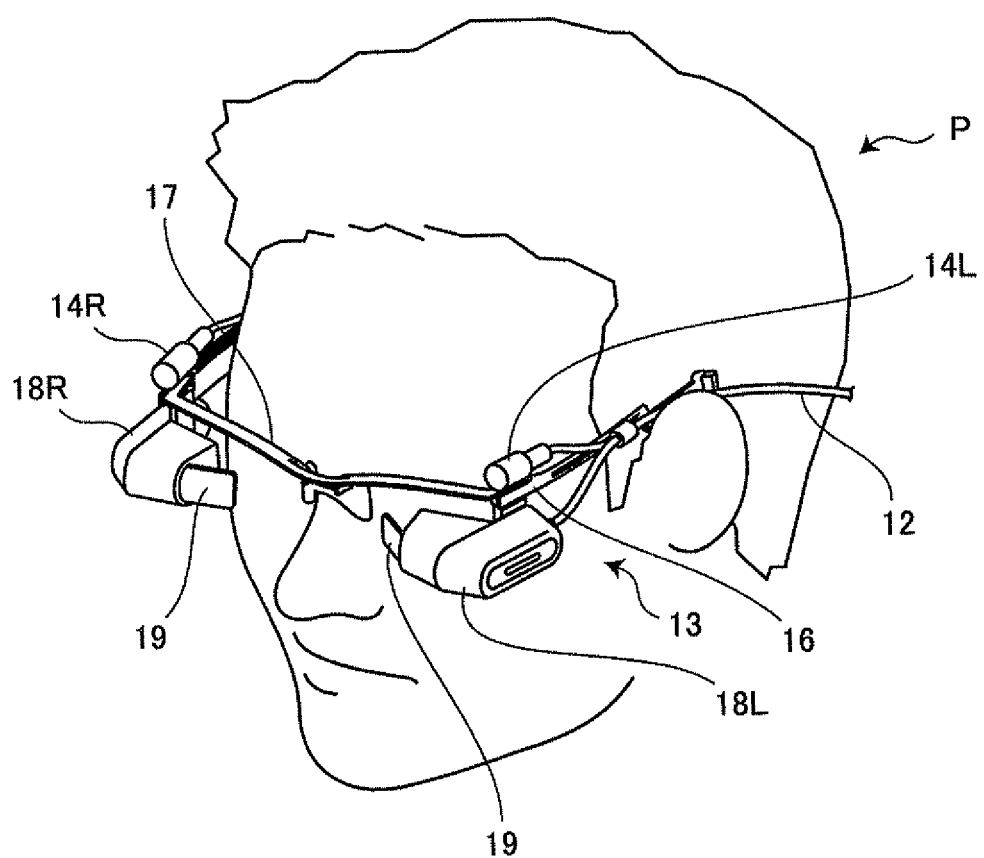
FIG. 7 is an explanatory view showing a state where the HMD according to the embodiment is mounted.

Next, the specific constitution of the HMD 10 of this embodiment is explained in conjunction with FIG. 6 and FIG. 7.

As shown in FIG. 6, the HMD 10 of this embodiment includes a controller 11, a transmission cable part 12 and a head mounted unit 13. The controller 11 forms image light based on the above-mentioned original image information or input from CCD cameras 14L, 14R described later. The transmission cable part 12 includes an optical fiber cable which transmits the image light irradiated from the controller 11. The head mounted unit 13 scans the image light transmitted by the transmission cable part 12 and projects the scanned image light on a user P thus displaying an image to the user P. Here, the transmission cable part 12 also includes an image-signal-transmission-use cable which transmits an imaged image signal, a vertical drive signal 35 and a horizontal drive signal 34 therethrough. The imaged image signal is a signal of an image which is imaged by the CCD cameras 14L, 14R described later. The horizontal drive signal 34 is a signal for taking synchronization between a horizontal scanning system 48 provided to light source parts 31L, 31R described later and a control part 30. The vertical drive signal 35 is a signal for taking synchronization between a vertical scanning system 51 provided to light source parts 31L, 31R and the control part 30.

An external input/output terminal 15 is formed on the controller 11. The controller 11 performs the transmission/reception of the original image information from the outside through the external input/output terminal 15. Further, the controller 11 is provided with a background cancel switch 20, an automatic processing switch 21, a mode changeover switch 22 and a power source switch 25. The background cancel switch 20 is a switch which the user manipulates for determining whether combining of the background cancel image G4 with the original image G5 is to be made valid or invalid. The automatic processing switch 21 is a switch which the user manipulates for determining whether or not the background image G1 is automatically cancelled by the control part 30. The mode changeover switch 22 is a switch which allows the user to select any one of the above-mentioned RGB separate reference background brightness setting mode, the above-mentioned RGB common reference background brightness setting mode, and the CCD upper-limit reference background brightness setting mode. The power source switch 25 is a switch which allows the user to manipulate the turning on or off of a power source of the HMD 10. These switches 20, 21, 22 function as manipulation units which can be manipulated by the user P respectively.

The background cancelling switch 20, the automatic processing switch 21 and the power source switch 25 are formed of a push-type switch which holds an ON state when pushed one time, and holds an OFF state when pushed again. Further, the mode changeover switch 22 is a slide switch which can be changed over in three stages. The respective switches 20, 21, 22, 25 are not limited to these switches provided that the switches 20, 21, 22, 25 can be manipulated by the user P. For example, the respective switches 20, 21, 22, 25 may be formed of a touch panel, and may be formed of a button-like virtual switch which is displayed on the user visually recognizing image G3 in accordance with programs stored in the ROM 101 described later.

As shown in FIG. 7, the head mounted unit 13 is provided with image forming parts 18L, 18R on both left and right sides of a front portion 17 of a support member 16 which has an approximately eyeglass shape. The image forming parts 18L, 18R scan an image light transmitted through the transmission cable part 12 for allowing the user P to visually recognize the image light transmitted through the transmission cable part 12 as a display image.

A half mirror 19 which constitutes a see-through part is provided to the image forming parts 18L, 18R respectively in such a manner that each half mirror 19 is disposed in front of an eye of the user P in a state where the user P wears the HMD 10. As shown in FIG. 6, the image forming parts 18L, 18R are configured such that an external light La passes through the half mirrors 19 and is incident on both eyes YL, YR of the user P, while an image light Lb is reflected on the half mirrors 19 and is incident on the eyes of the user P. Here, the half mirrors 19 also allow the external light of a quantity adjusted by multiplying of the transmittance α and hence, the user P can visually recognize a display image and a background image simultaneously. The image forming parts 18L, 18R scan image lights whose intensities are modulated for respective colors (R, G, B) in the two-dimensional directions, and allows the scanned image lights to be incident on the eyes YL, YR of the user P, and scans the image lights in the two dimensional directions on retinas of the eyes YL, YR of the user P. That is, the image forming parts 18L, 18R constitute a retinal scanning display which allows the user P to visually recognize a display image. The image forming parts 18L, 18R may be constituted of a display where the user P can visually recognize contents in such a manner that an image light which is formed by transmission through an LCD (liquid crystal display) or reflection on the LCD is projected on eyes of the user P so that the image is projected on retinas of the eyes of the user P.

In this manner, the HMD 10 is a see-through-type HMD where the image light is projected on the eyes of the user P while allowing the external light to pass therethrough.

Further, in the head mounted unit 13, the CCD cameras 14L, 14R for imaging are arranged on left and right sides of the support member 16 in a state where one CCD camera is arranged on each side. The CCD cameras 14L, 14R are arranged such that the CCD cameras 14L, 14R can image a range including a background image which the user P visually recognizes when the user P wears the head mounted unit 13. That is, the CCD cameras 14L, 14R function as imaging units which image a predetermined range including a range where at least the display image is displayed among a field-of-view range of the user P.

Imaged image signals which are formed by the CCD cameras 14L, 14R are transmitted to the controller 11 through the transmission cable part 12.

[Electric Constitution and Optical Constitution of HMD 10]

Figure 8:
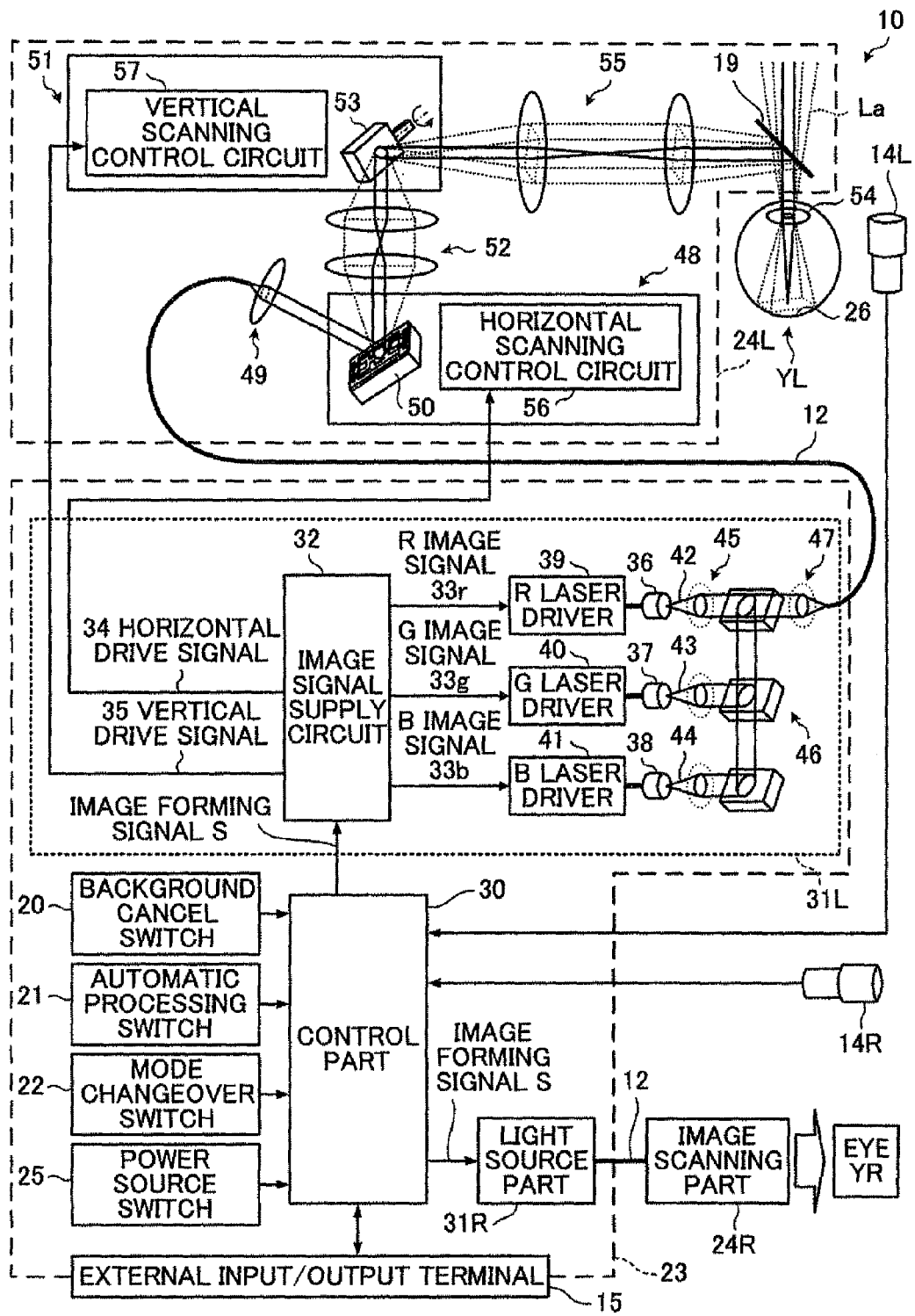
FIG. 8 is a block diagram showing the electrical constitution and the optical constitution of the HMD according to the embodiment.

Next, the electric constitution and the optical constitution of the HMD 10 which the user P wears are explained in conjunction with FIG. 8.

The HMD 10 includes an image light forming part 23 which is housed in a housing of the controller 11, and two image scanning parts 24L, 24R housed in image forming parts 18L, 18R respectively. Here, both of the left and right image scanning parts 24L, 24R have the substantially equal constitution, and both of the left and right light source parts 31L, 31R described later have the substantially equal constitution. Accordingly, in conjunction with FIG. 8, the image scanning part 24L and the light source part 31L which perform a display of an image to a left eye YL are explained in detail, while the image scanning part 24R and the light source part 31R which perform a display of the image to a right eye YR are described in a simplified manner.

The image light forming part 23, the transmission cable part 12, and the image scanning parts 24L, 24R function as a display unit which allows the user to visually recognize the image corresponding to the image light in such a manner that image light having the intensity corresponding to the image information is projected on an eye of the user thus projecting an image on a retina of the eye of the user while allowing an external light to pass therethrough.

The image light forming part 23 includes the control part 30 and two light source parts 31L, 31R. The control part 30 controls the whole HMD 10, and executes the predetermined processing in accordance with a flow described later based on a program stored in the inside thereof. Here, the program may be recorded in a recording medium such as a CD-R or a DVD-R, for example, and thereafter, may be read by the control part 30 through a recording medium drive not shown in the drawing.

Further, the background cancel switch 20, the automatic processing switch 21, the mode changeover switch 22 and the power source switch 25 are connected to the control part 30. The control part 30 monitors states of the respective switches 20, 21, 22, 25.

Further, the external input/output terminal 15 is connected to the control part 30. The external input/output terminal 15 is a terminal for allowing the transmission/reception of the original image information between an external connection device such as a personal computer, for example, and the control part 30.

Further, two left and right CCD cameras 14L, 14R are connected to the control part 30. The CCD cameras 14L, 14R allow the supply of respective left and right imaged image data to the control part 30.

The light source part 31L is provided with an image signal supply circuit 32. The image signal supply circuit 32 transmits respective signals which become elements for forming a display image based on an image forming signal S generated by the control part 30. That is, an R (red) image signal 33r, a G (green) image signal 33g, a B (blue) image signal 33b, the horizontal drive signal 34 and the vertical drive signal 35 are outputted from the image signal supply circuit 32.

Further, the light source part 31L includes an R laser driver 39 for driving an R laser 36, a G laser driver 40 for driving a G laser 37 and a B laser driver 41 for driving a B laser 38. The R laser driver 39, the G laser driver 40 and the B laser driver 41 allow the R laser 36, the G laser 37 and the B laser 38 to irradiate laser beams whose intensities are respectively modulated in response to respective image signals consisting of an R image signal 33r, a G image signal 33g and a B image signal 33b.

Further, the light source part 31L includes a collimation optical system 45, a dichroic mirror 46 and a coupling optical system 47. The collimation optical system 45 collimates the laser beam (R formation light 42, G formation light 43, B formation light 44) irradiated from the respective lasers 36, 37, 38. The dichroic mirror 46 synthesizes the laser beams which are collimated by the collimation optical system 45 respectively. The coupling optical system 47 guides an image light formed of the synthesized laser beams, that is, an image light to the transmission cable part 12.

Here, the R laser 36, the G laser 37 and the B laser 38 may be constituted of a semiconductor laser such as a laser diode or a solid-state laser.

On the other hand, the image scanning part 24L includes a collimation optical system 49, a horizontal scanning system 48, a first relay optical system 52, a vertical scanning system 51, a second relay optical system 55 (projection optical system) and a half mirror 19. The collimation optical system 49 guides the image light transmitted from the image light forming part 23 through the transmission cable part 12 to the horizontal scanning system 48. The horizontal scanning system 48 scans the collimated image light by making use of an optical scanning element 50 in the horizontal direction. The first relay optical system 52 guides the image light scanned by the horizontal scanning system 48 to the vertical scanning system 51. The vertical scanning system 51 scans the image light which is scanned by the horizontal scanning system 48 and is incident thereon through the first relay optical system 52 by making use of a Galvano mirror 53 in the vertical direction approximately perpendicular to the horizontal direction. The second relay optical system 55 arranges an exit pupil at a position corresponding to pupils of the eyes of the user P so as to allow the image light which is scanned by the vertical scanning system 51 to be incident on pupils 54 of eyes YL, YR of the user P.

The image light which is two-dimensionally scanned, is reflected on the half mirror 19 and is incident on the pupil 54 of the user P is projected on the retina 26. Due to such an operation, the user P can visually recognize a user visually recognizing image G3 which is formed by superposition of a display image G2 which is formed by image retention of the image light and a background image G1 visually recognized from an external light La.

The horizontal scanning system 48 includes an optical scanning element 50 and a horizontal scanning control circuit 56. The optical scanning element 50 scans the image light in the horizontal direction. The horizontal scanning control circuit 56 performs a drive control of the optical scanning element 50. The horizontal scanning system 48 is an optical system which scans the image light for every 1 scanning line of an image to be displayed in the horizontal direction.

The vertical scanning system 51 includes a Galvano mirror 53 and a vertical scanning control circuit 57. The Galvano mirror 53 scans the image light in the vertical direction. The vertical scanning control circuit 57 performs a drive control of the Galvano mirror 53. The vertical scanning system 51 is an optical system which scans the image light from a first scanning line to a last scanning line for every 1 frame of an image to be displayed in the vertical direction.

The horizontal scanning system 48 is designed so as to scan the image light at a higher speed, that is, with higher frequency than the vertical scanning system 51. Further, the horizontal scanning system 48 and the vertical scanning system 51 are, as shown in FIG. 8, connected to an image signal supply circuit 32 respectively, and are configured to scan the image light in synchronism with a horizontal drive signal 34 and a vertical drive signal 35 outputted from the image signal supply circuit 32 respectively.

[Constitution of Control Part 30]

Figure 9:
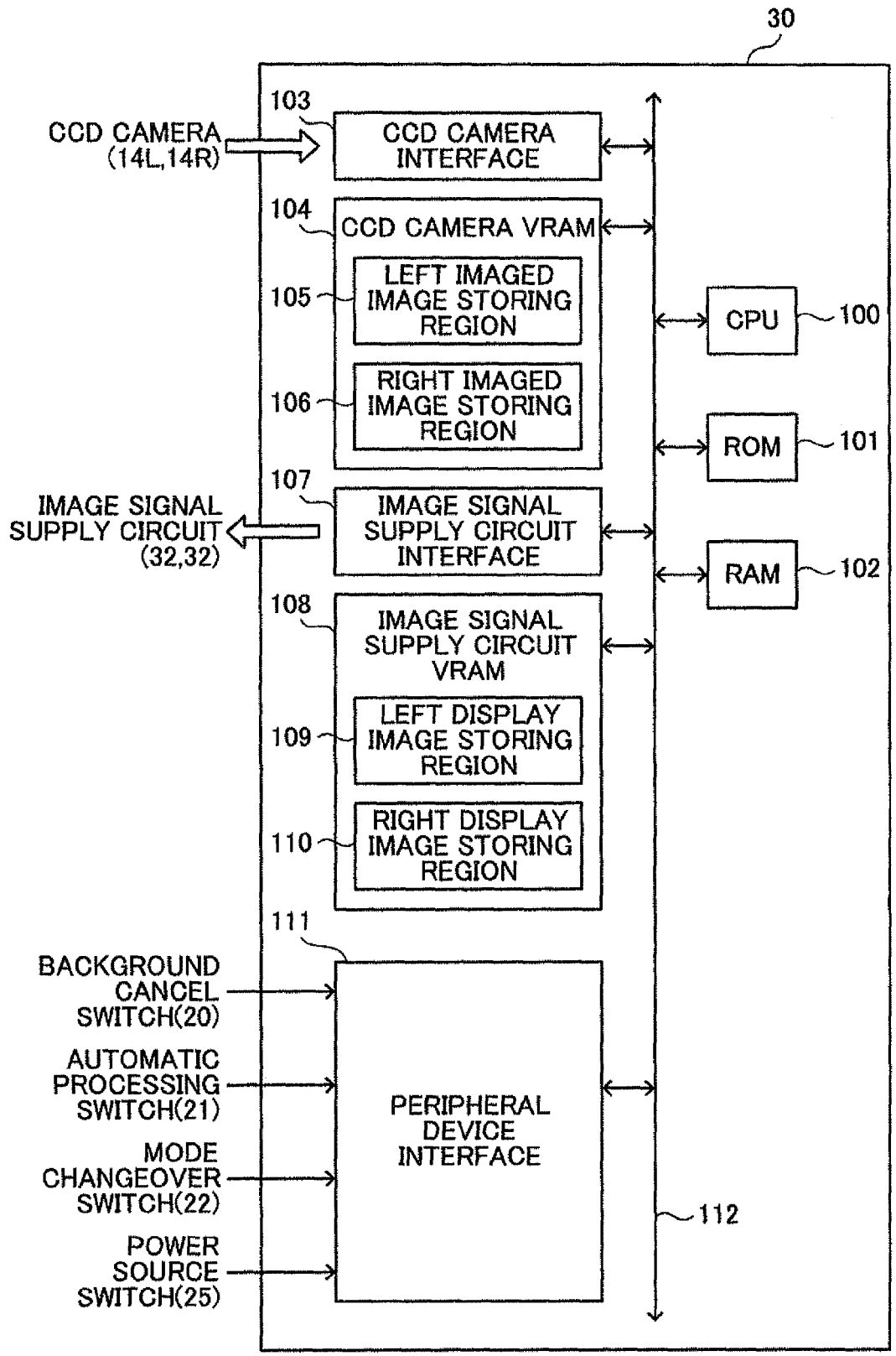
FIG. 9 is a block diagram showing the constitution of a control part of the HMD according to the embodiment.

Next, the constitution of the control part 30 arranged in the inside of the image light forming part 23 is explained in conjunction with FIG. 9.

The control part 30 includes a CPU 100, a ROM 101, a RAM 102, a CCD camera interface 103, a CCD camera VRAM 104, an image signal supply circuit interface 107, an image signal supply circuit VRAM 108, and a peripheral device interface 111. These parts are mutually connected with each other through a system bus 112.

A program for realizing processing in accordance with a flowchart described later when the program is executed by the CPU 100 is stored in the ROM 101. Further, in the ROM 101, transmittance α, a brightness upper limit value which allows the CCD cameras 14L, 14R to perform imaging and cancellation condition table all of which the CPU 100 looks up are stored.

The cancellation condition table is a table which the CPU 100 looks up for determining whether or not an imaged image is a specified imaged image in executing a flow described later. The cancellation condition table includes information on conditions necessary for forming a cancellation image. The conditions include, for example, a condition that a cancellation image is formed when a change in brightness of the whole background image is extremely large, a condition that a cancellation image is formed when a state of an original image is such that the original image becomes indistinguishable from the background image.

RAM 102 functions as a temporary storage region for temporarily storing various flags, image data and the like which the CPU 100 looks up.

The CCD camera interface 103 plays a role of connecting two, that is, left and right CCD cameras 14L, 14R to each other. The CCD camera interface 103 also plays a role of converting imaged image signals for 1 frame transmitted from the CCD cameras 14L, 14R into an imaged image (imaged image data) and of writing the imaged image data into a CCD camera VRAM 104.

The CCD camera VRAM 104 has a function of storing the imaged image data obtained by conversion using the CCD camera interface 103 into a left imaged image storing region 105 and a right imaged image storing region 106 separately from each other for every frame. Although described in detail later, the CPU 100 forms a background cancelling image G4 based on the imaged image data stored in the left and right imaged image storing region 105, 106 of the CCD camera VRAM 104.

The image signal supply circuit interface 107 plays a role of connecting the control part 30 with the image signal supply circuit 32. The image signal supply circuit interface 107, by looking up the image signal supply circuit VRAM 108, generates the left and right separate image forming signals S and supplies the image forming signals S to the image signal supply circuit 32.

The image signal supply circuit VRAM 108 stores a display image G2. The image signal supply circuit interface 107, by looking up the image signal supply circuit VRAM 108, supplies the image forming signals S to the respective image signal supply circuit 32 which are arranged in two, that is, left and right light source parts 31L, 31R.

To be more specific, in the inside of the image signal supply circuit VRAM 108, a left display image storing region 109 and a right display image storing region 110 are arranged. The image signal supply circuit interface 107 generates an image forming signal S based on image data stored in the left display image storing region 109, and supplies the image forming signal S to the image signal supply circuit 32 of the light source part 31L for a left eye YL as image information on the display image G2. On the other hand, The image signal supply circuit interface 107 generates an image forming signal S based on image data stored in the right display image storing region 110, and supplies the image forming signal S to the image signal supply circuit 32 of the light source part 31R for a right eye YR as image information on the display image G2.

Here, the display image G2 is constituted of images written in the left and right display image storing regions 109, 110 of the image signal supply circuit VRAM 108 respectively. Accordingly, when a combined image G6 is written in the left and right display image storing regions 109, 110, a mask region M is displayed on a user visually recognizing image G3. On the other hand, when only an original image G5 is written in the left and right display image storing regions 109, 110, the original image G5 turns into the display image G2 so that the mask region M does not appear on the user visually recognizing image G3.

The peripheral device interface 111 plays a role of controlling operations of peripheral devices connected to the control part 30 and a role of transmitting and receiving signals. To the peripheral device interface 111, the previously-mentioned background cancelling switch 20, the automatic processing switch 21 and the mode changeover switch 22 are connected.

The peripheral device interface 111, when the background cancelling switch 20, the automatic processing switch 21 or the power source switch 25 is brought into an ON state or an OFF state, for example, raises flags which indicate that the respective switches are in an ON state or an OFF state at a predetermined address of the RAM 102. Further, the peripheral device interface 111, when the mode changeover switch 22 is changed, detects a mode selected by the mode changeover switch 22, and raises a flag indicating a selected mode at a predetermined address of the RAM 102.

These flags are looked up by the CPU 100 during the execution of a program. Based on these flags, the CPU 100 can carry out the determination whether or not the above-mentioned combining of the background cancelling image G4 with the original image G5 is to be made valid, the determination whether or not the background image G1 is to be automatically cancelled or the determination whether or not the transition into a power source OFF state is to be performed, the determination on the selection of a setting mode among the above-mentioned RGB separate reference background brightness setting mode, RGB common reference background brightness setting mode and CCD upper-limit reference background brightness setting mode.

[Processing Flow of the Control Part]

Next, the processing in the control part 30 in the HMD 10 is explained in conjunction with FIG. 10 to FIGS. 12A and 12B.

Figure 10:
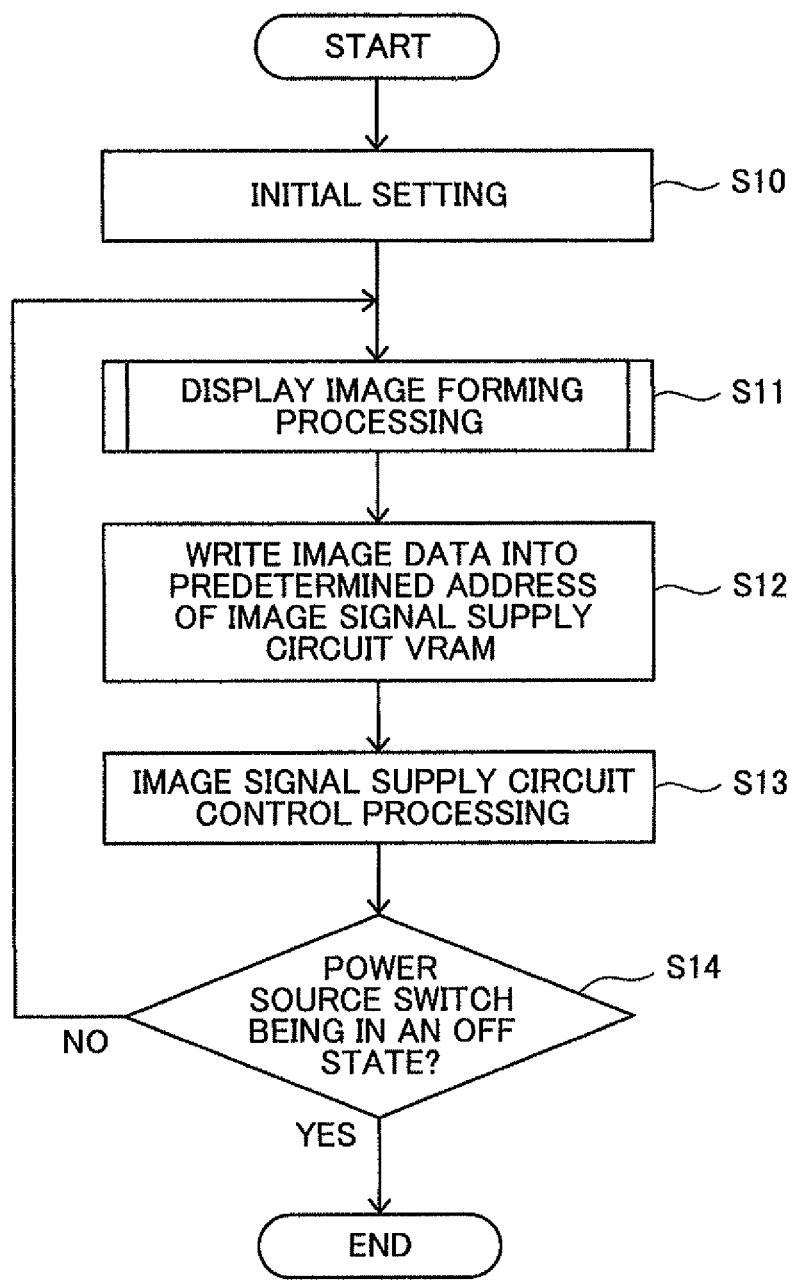
FIG. 10 is a flowchart showing an operation of processing executed in the HMD according to the embodiment.

Firstly, a main flow is explained in conjunction with FIG. 10. The CPU 100 of the control part 30 firstly executes initial setting such as the permission of access to the RAM 102 and the initialization of a working area (step S10).

Then, the CPU 100 executes display image forming processing for forming the display image G2 (step S11). This display image forming processing is explained in further detail later in conjunction with FIGS. 11A and 11B. When this display image forming processing is finished, the CPU 100 advances the processing to step S12.

In step S12, the CPU 100 writes the display image G2 which is formed in step S11 and is to be displayed in the respective left and right eyes YL, YR into the left and right display image storing regions 109, 110 of the image signal supply circuit VRAM 108.

Next, the CPU 100 executes the image signal supply circuit control processing (step S13). In this image signal supply circuit control processing, the CPU 100 instructs the image signal supply circuit interface 107 to transmit the image forming signal S to the image signal supply circuits 32 of the left and right light source parts 31L, 31R respectively. By executing this step S13, the CPU 100 functions as a display control unit which performs a control such that an image formed by combining the background cancelling image G4 with the original image G5 is displayed by the display unit. The display unit is constituted of the image light forming part 23, the transmission cable part 12 and the image scanning parts 24L, 24R.

Next, the CPU 100 determines whether or not the power source switch 25 is in an OFF state (step S14). Here, when the CPU 100 determines that the power source switch 25 is in an OFF state (step S14: Yes), the CPU 100 finishes the processing. On the other hand, when CPU 100 determines that the power source switch 25 is not in an OFF state (step S14: No), the CPU 100 returns the processing to step S11.

Figure 11A:
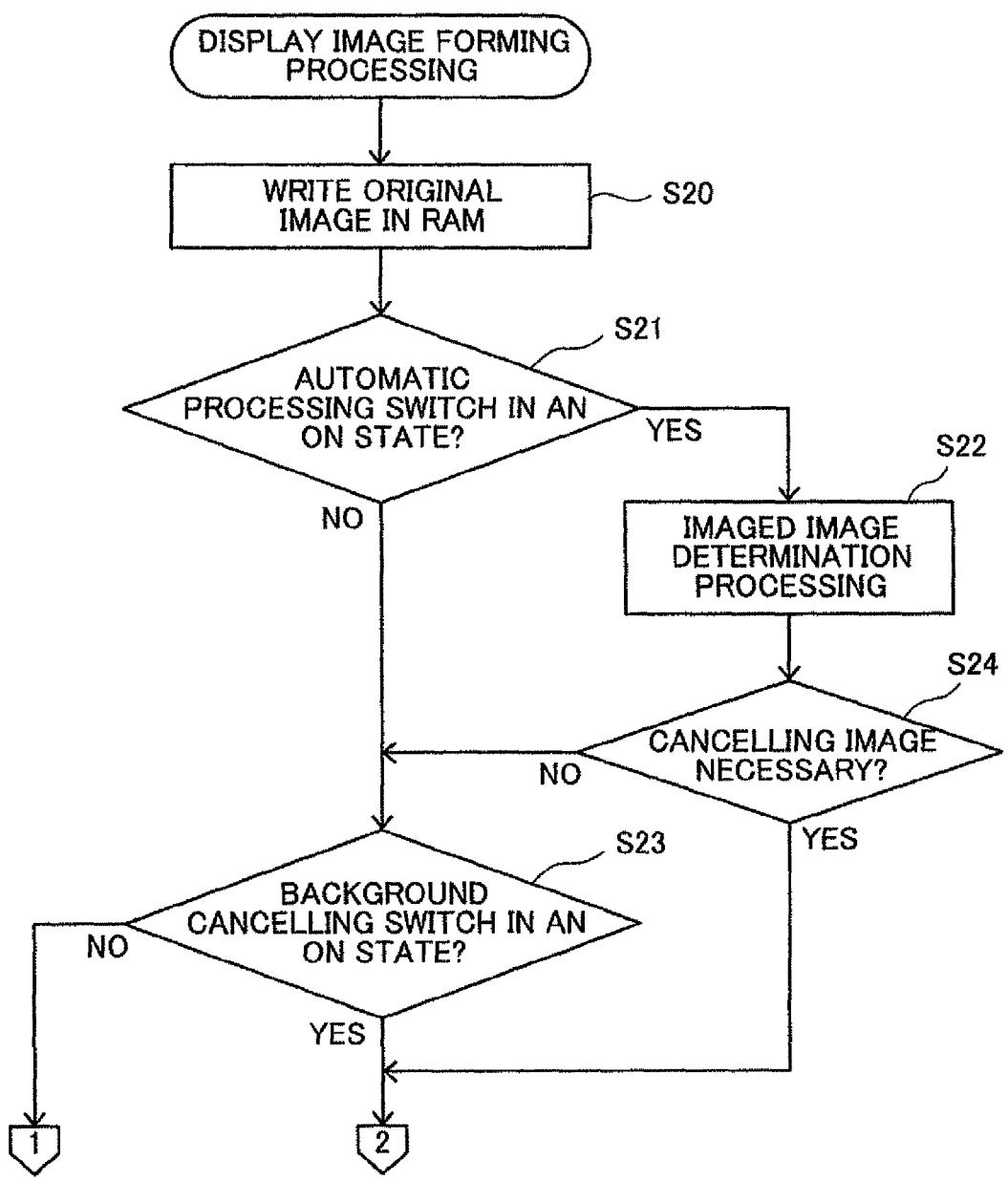
FIG. 11A is a flowchart showing an operation of processing executed in the HMD according to the embodiment.
Figure 11B:
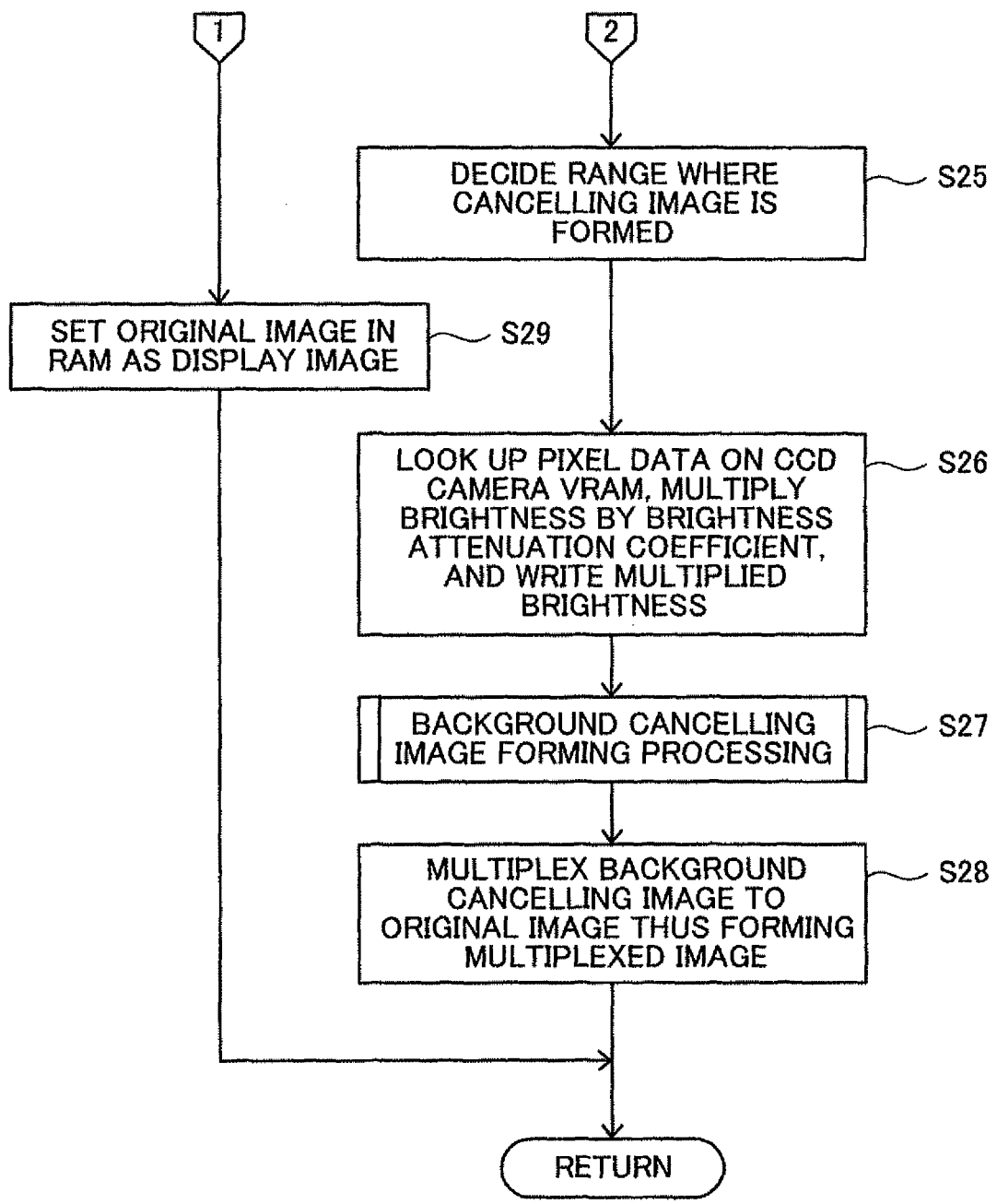
FIG. 11B is a flowchart showing an operation of processing executed in the HMD according to the embodiment.

Next, the display image forming processing executed in step S11 of the main flow is explained in conjunction with FIGS. 11A and 11B.

Firstly, in the display image forming processing, the CPU 100 writes an original image in the RAM 102 (step S20).

Secondly, the CPU 100 determines whether or not the automatic processing switch 21 is in an ON state (step S21). Here, when the CPU 100 determines that the automatic processing switch 21 is in an ON state (step S21: Yes), the CPU 100 advances the processing to step S22. On the other hand, when the CPU 100 determines that the automatic processing switch 21 is in an OFF state (step S21: No), the CPU 100 advances the processing to step S23.

In step S22, the CPU 100 looks up the left and right imaged image storing regions 105, 106 of the CCD camera VRAM 104, compares the left and right imaged image storing regions 105, 106 with the cancelling condition table stored in the ROM 101, and determines whether or not the formation of the cancelling image is necessary (step S24).

When the CPU 100 determines that the formation of the cancelling image is necessary (step S24: Yes), the CPU 100 advances the processing to step S25. On the other hand, when the CPU 100 determines that the formation of the cancelling image is not necessary (step S24: No), the CPU 100 advances the processing to step S23. By executing step S22 and this step S24, the CPU 100 functions as an imaged image analyzing unit which analyzes the imaged image and an imaged image determination unit which determines whether or not an imaged image is a specific imaged image based on an analysis result obtained by the imaged image analyzing unit.

In step S23, the CPU 100 looks up the RAM 102, and determines whether or not the background cancelling switch 20 is in an ON state. When the CPU 100 determines that the background cancelling switch 20 is in an ON state (step S23: Yes), the CPU 100 advances the processing to step S25. On the other hand, when the CPU 100 determines that the background cancelling switch 20 is not in an ON state (step S23: No), the CPU 100 sets the original image written in the RAM in step S20 as a display image (step S29) and finishes the display image forming processing. By executing this step S23, the CPU 100 functions as a display decision unit which decides whether the superposition of the background cancelling image G4 on the original image G5 is to be made valid or invalid in response to the manipulation of the manipulation unit.

In step S25, the CPU 100 looks up the original image G5 read in the RAM 102 in step S20, and decides a range where the background cancelling image G4 is formed. The CPU 100 can decide the range where the background cancelling image G4 is formed based on a size and a position of the image for displaying the original image G5. For example, the CPU 100 can set the range where the background cancelling image G4 is formed equal to a range where the original image G5 is displayed or slightly larger than the range where the original image G5 is displayed upwardly and downwardly as well as leftwardly and rightwardly.

Next, the CPU 100 looks up pixel data on the left and right imaged image storing regions 105, 106 of the CCD camera VRAM 104, multiplies the brightness by transmittance $\alpha$ for respective sub pixels of three primary colors of each pixel data, and stores adjusted images of respective colors in the RAM 102 (step S26).

Next, the CPU 100 executes the background cancelling image forming processing (step S27). This background cancelling image forming processing is explained later in conjunction with FIGS. 12A and 12B. By executing this step S27, the CPU 100 functions as an image forming unit which forms the background cancelling image G4 based on the imaged image imaged by the imaging unit. When the CPU 100 finishes the background cancelling image forming processing, the CPU 100 advances the processing to step S28.

In step S28, the CPU 100 performs combining by adding brightnesses of the sub pixels of respective colors of the background cancelling image G4 with the brightnesses of the sub pixels of respective colors (red, green, blue) of the original image G5 stored in the RAM 102 thus forming a combined image G6. Here, the formed background cancelling image G4 is combined with the original image G5 within a range (position) decided in step S25. By executing the step S28, the CPU 100 functions as an image processing unit which combines the background cancelling image G4 with the original image G5 corresponding to original image information in alignment with a display position. When the CPU 100 finishes this step S28, the CPU 100 advances the processing to step S12 shown in FIG. 10.

Figure 12A:
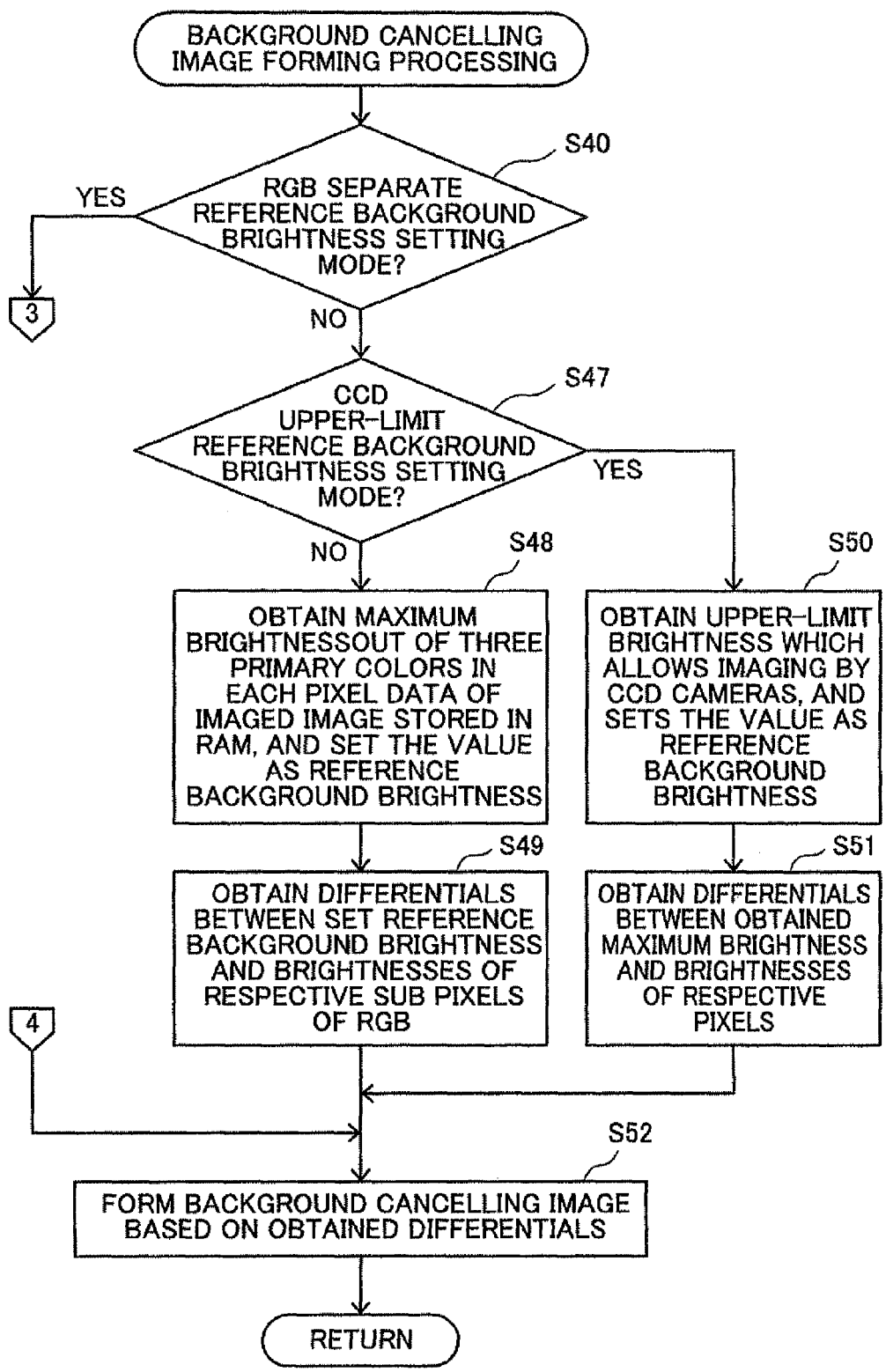
FIG. 12A is a flowchart showing an operation of processing executed in the HMD according to the embodiment.
Figure 12B:
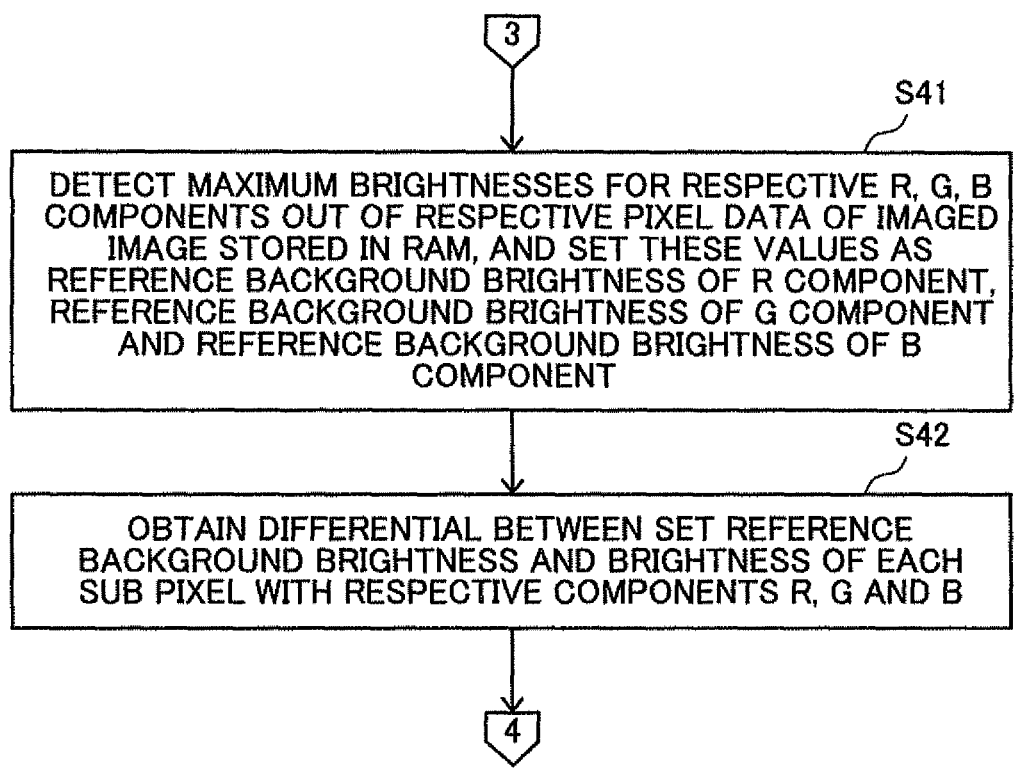
FIG. 12B is a flowchart showing an operation of processing executed in the HMD according to the embodiment.

Next, the background cancelling image forming processing executed in step S27 for display image forming processing is explained in conjunction with FIGS. 12 and 12B.

In the background cancelling image forming processing, the CPU 100 firstly looks up flags stored in the RAM 102, and determines whether or not an RGB separate reference background brightness setting mode is set by the mode changeover switch 22 (step S40).

When the CPU 100 determines that the RGB separate reference background brightness setting mode is set (step S40: Yes), the CPU 100 advances the processing to step S41.

In step S41, the CPU 100 detects the maximum brightnesses for respective R, G, B components (for the respective sub pixels) out of the respective pixel data of the adjusted image amounting to 1 frame which is stored in the RAM 102, and sets these values as the reference background brightness of the R component, the reference background brightness of the G component and the reference background brightness of the B component. The adjusted image is the imaged image which is obtained through conversion by multiplying transmittance α.

Next, the CPU 100 obtains a difference between the set reference background brightness and the brightness of each sub pixel with respect to respective components R, G and B, and stores the differences in the RAM 102 (step S42). When the CPU 100 finishes this step S42, the CPU 100 advances the processing to step S52.

On the other hand, in step S40, when the CPU 100 determines that the RGB separate reference background brightness setting mode is not set (step S40: No), the CPU 100 advances the processing to step S47.

In step S47, the CPU 100 looks up flags stored in the RAM 102, and determines whether or not a CCD upper-limit reference background brightness setting mode is set by the mode changeover switch 22.

When the CPU 100 determines that the CCD upper-limit reference background brightness setting mode is not set (step S47: No), that is, when an RGB common reference background brightness setting mode is set by the mode changeover switch 22, the CPU 100 advances the processing to step S48.

In step S48, the CPU 100 obtains the maximum brightness out of three primary colors (respective sub pixels of RGB) in each pixel data of the adjusted image stored in the RAM 102, and sets this value as the reference background brightness K.

Next, the CPU 100 obtains differences between the set reference background brightness K and the brightnesses of the respective sub pixels of RGB and stores the differences in the RAM 102 (step S49). When the CPU 100 finishes this step S49, the CPU 100 advances the processing to step S52.

On the other hand, when the CPU 100 determines that the CCD upper-limit reference background brightness setting mode is set (step S47: Yes), the CPU 100 advances the processing to step S50.

In step S50, the CPU 100 obtains a brightness value by multiplying a brightness upper-limit value which allows imaging by the CCD cameras 14L, 14R by transmittance α from the ROM 101, and sets the value as the reference background brightness K.

Next, the CPU 100 obtains differences between the set reference background brightness K and the brightnesses of the respective sub pixels of RGB and stores the differences in the RAM 102 (step S51). Here, the background cancelling image G4 is formed within a brightness range from the minimum brightness to the maximum brightness with which imaging by the CCD cameras 14L, 14R is allowed. When the CPU 100 finishes this step S51, the CPU 100 advances the processing to step S52.

In step S52, the CPU 100 forms a background cancelling image based on the obtained differences which are stored in the RAM 102, and finishes the background cancelling image forming processing.

In this manner, the HMD 10 according to this embodiment is operated in accordance with the above-mentioned flow.

As has been explained heretofore, according to the HMD 10 of this embodiment, it is possible to provide the HMD (for example, HMD 10) which allows the user to sufficiently visually recognize a fine image (for example, the original image G5) by preventing the fine image from becoming indistinguishable from a background (for example, background image G1) although the HMD 10 is a see-through-type HMD.

Finally, the above-mentioned respective embodiments are merely examples of the present invention, and the present invention is not limited to the above-mentioned embodiments. Accordingly, it is needless to say that the present invention includes embodiments other than the above-mentioned embodiments where various modifications are made depending on designs provided that these embodiments do not depart from the technical concept of the present invention.

For example, in the above-mentioned HMD according to this embodiment, the explanation has been made by taking the retinal scanning display as an example. However, the image display device is not limited to the retinal scanning display provided that the image display device is a see-through-type image display device. For example, the HMD is also applicable to an image display device which uses an LCD.

In the above-mentioned HMD according to this embodiment, as shown in FIG. 7, an image is displayed on both eyes YL, YR of the user P. However, the image may be displayed on either one of left and right eyes YL, YR.

In the display image forming processing shown in FIGS. 11A and 11B, in addition to the processing carried out now, a state where a change of the background image with time is vigorous may be detected, and the mode of the operation may be changed over to the CCD upper-limit reference background brightness setting mode or the formation of a cancelling image may not be performed based on a detected value.

In the above-mentioned HMD according to this embodiment, the background cancelling image G4 is formed and the display image G2 is formed by combining the background cancelling image G4 with the original image G5 by performing the digital processing. However, such processing may be performed by processing analog signals using an operational amplifier or the like. For example, a display image may be realized such that an imaging signal is reversed, a level of the imaging signal is adjusted corresponding to see-through transmittance or the like thus forming a signal which cancels a background image, and the signal is superposed on a display image signal.

What is claimed is:

1. A head mounted display comprising:
    a display unit which is configured to project an image light having intensity corresponding to image information on an eye of a user thus allowing the user to visually recognize an image corresponding to the image light while allowing an external light to pass therethrough;
    an imaging unit which is configured to image a predetermined range including at least a range where the image is displayed out of a field-of-view range of the user;
    an image forming unit which is configured to form a background cancelling image based on an image imaged by the imaging unit, wherein when the background cancelling image is superposed on a background image derived from the external light and visually recognized by the user, the background cancelling image superposed on the background image constitutes an image having reference background brightnesses with a predetermined constant brightnesses within a predetermined frame period for respective three primary colors and thereby cancels the background image, and wherein the background cancelling image is formed by the following steps: i) determining a brightness of the background image for each color, ii) calculating a difference in a brightness between the background image and a reference background brightness for each color and iii) forming the background cancelling image having a respective brightness for each color based on the difference in the brightness between the background image and the reference background brightness for each color;
    an image processing unit which is configured to combine the background cancelling image with an original image corresponding to original image information by aligning the background cancelling image and the original image with each other in terms of display position and size; and
    a display control unit which is configured to perform a control by which an image to which the background cancelling image is combined is displayed by the display unit.

2. The head mounted display according to claim 1, wherein the image forming unit is configured to set, based on maximum brightnesses of respective colors of the imaged image, the reference background brightnesses for respective colors.

3. The head mounted display according to claim 1, wherein the image forming unit is configured to set the reference background brightness for respective colors based on the highest brightness out of maximum brightnesses for respective colors of the imaged image.

4. The head mounted display according to claim 1, wherein the image forming unit is configured to set the reference background brightness based on maximum brightness with which imaging by the imaging unit is allowed.

5. The head mounted display according to claim 1, further comprising:
    a manipulation unit which is manipulable by the user; and
    a display deciding unit which is configured to decide whether combining of the original image with the background cancelling image is to be made valid or invalid in response to a manipulation of the manipulation unit.

6. The head mounted display according to claim 1, further comprising:
    an imaged image analyzing unit which is configured to analyze the imaged image;
    an imaged image determination unit which is configured to determine whether or not the imaged image is a specific imaged image, the determination being made based on a result of analysis made by the imaged image analyzing unit; and
    a display deciding unit which is configured to decide whether combining of the original image with the background cancelling image is to be made valid or invalid based on a result of determination made by the imaged image determination unit.

7. A head mounted display comprising:
    a display unit which is configured to project an image light having intensity corresponding to image information on an eye of a user thus allowing the user to visually recognize an image corresponding to the image light while allowing an external light to pass therethrough;
    an imaging unit which is configured to image a predetermined range including at least a range where the image is displayed out of a field-of-view range of the user;
    an image forming unit which is configured to form a background cancelling image based on an image imaged by the imaging unit, wherein when the background cancelling image is superposed on a background image derived from the external light and visually recognized by the user, the background cancelling image superposed on the background image constitutes an image having reference background brightnesses with a predetermined constant brightnesses within a predetermined frame period for respective three primary colors and thereby cancels the background image, and wherein the background cancelling image has brightnesses that are differences between the reference background brightnesses and brightnesses of the background image for respective three primary colors;
    an image processing unit which is configured to combine the background cancelling image with an original image corresponding to original image information by aligning the background cancelling image and the original image with each other in terms of display position and size; and
    a display control unit which is configured to perform a control by which an image to which the background cancelling image is combined is displayed by the display unit.

* * * * *